United States Patent [19]

Biglione et al.

[11] 4,003,858
[45] Jan. 18, 1977

[54] PROCESS FOR PRODUCING EXPANDIBLE STYRENE POLYMERS USEFUL IN THE MANUFACTURE OF SHAPED CELLULAR ARTICLES

[75] Inventors: Gianfranco Biglione; Antonio Alvares, both of Mantova; Guido Bertazzoni, Campitello di Marcaria (Mantova), all of Italy

[73] Assignee: Montedison Fibre S.p.A., Milan, Italy

[22] Filed: Dec. 20, 1974

[21] Appl. No.: 534,776

[30] Foreign Application Priority Data

Dec. 24, 1973 Italy .................................. 54581/73

[52] U.S. Cl. ...................... 260/2.5 HB; 260/2.5 M; 260/2.5 B; 260/18 R; 264/DIG. 9
[51] Int. Cl.² ...................... C08J 9/02; C08J 9/16; C08J 9/22
[58] Field of Search ....... 260/2.5 HB, 2.5 B, 2.5 M, 260/18 R; 264/DIG. 9

[56] References Cited

UNITED STATES PATENTS

| | | | |
|---|---|---|---|
| 3,385,804 | 5/1968 | Hill | 260/2.5 B |
| 3,491,033 | 1/1970 | Dunn | 260/2.5 L |
| 3,663,466 | 5/1972 | Jablonski | 260/2.5 B |

Primary Examiner—John Kight, III

[57] ABSTRACT

Expandible particles of styrene polymers are prepared by a process in which the polymerization of styrene, or of mixtures of styrene and monomers copolymerizable with it, and/or treatment of the expandible particles prior to expansion thereof, are (is) carried out in the presence of dimers or trimers of unsaturated fatty acids or their esters with $C_1$–$C_{18}$ alcohols.

9 Claims, No Drawings

PROCESS FOR PRODUCING EXPANDIBLE STYRENE POLYMERS USEFUL IN THE MANUFACTURE OF SHAPED CELLULAR ARTICLES

THE PRIOR ART

It is known to obtain molded objects from expanded styrene polymers by forming fine particles of the polymers in molds which are closed but not gas-tight, operating at a temperature above the boiling point of the expanding agent and softening point of the polymeric material.

According to a procedure commonly followed, the polymer particles containing the expanding agent are first heated (pre-expansion) in either a closed or open vessel, to a predetermined apparent density and then, after an adequate ageing period, are further expanded by heating (molding) in a mold which is pressure resistant but not gas-tight.

As a result of this heating, the particles are sintered into a body or object which takes the shape of the mold.

After molding, the shaped body is left in the mold to cool for a period of time sufficiently long to avoid deformation thereof on removal from the mold.

Said procedure is not entirely free of drawbacks. In fact, the expandible particles may sinter during the pre-expansion step thereby causing crumbs or long cooling of the molded blocks or other objects in the mold may be required before the objects can be removed from the mold without any risk of blowings or swellings and deformations.

THE PRESENT INVENTION

One object of this invention is to provide a process for producing expandible particles of styrene polymers which are particularly suitable for obtaining molded bodies, especially blocks of large dimensions, having a uniform cellular structure and a short residence time in the mold, and which process is free from the drawbacks and disadvantages of the conventional process discussed above.

This and other objects are accomplished by the present process comprising the following steps in the order stated: polymerization of styrene (or mixtures of styrene with monomers copolymerizable therewith); addition of the expanding agent, preferably during the polymerization; treatment of the expandible particles to avoid agglomerization thereof in the pre-expansion stage; pre-expansion of the treated expandible particles; ageing of the pre-expanded particles; and finally, molding of the pre-expanded and matured particles.

In the process stated, and in accordance with this invention, the polymerization and/or the treatment of the expandible particles prior to pre-expansion thereof, are (is) conducted in the presence of from 0.005 to 0.5% by weight, preferably from 0.05 to 0.25% by weight of dimers or trimers of unsaturated fatty acids or their esters with $C_1-C_{18}$ alcohols.

Surprisingly, it has been found that shaped bodies, and more particularly blocks of large dimensions, prepared by the present process, have the following characteristics, in combination:

a. short residence time in the mold, equal to, and even below, 50% of the time necessary for cooling shaped bodies in general, and of large blocks in particular, molded from pre-expanded particles of styrene polymers not containing dimers or trimers of unsaturated higher fatty acids or esters thereof with $C_1-C_{18}$ alcohols added during the polymerization or to the expandible particles prior to pre-expansion thereof;

b. shrinkage of the block thickness: 1% c. high degree of sintering.

When dimers or trimers of higher unsaturated acids are used for treating the expandible particles before pre-expansion, the particles thus treated do not show any practical drawback in the pre-expansion stage due to the formation of crumbs.

The dimers or trimers of higher unsaturated fatty acids or their esters used in the present process may be selected from a wide range of products.

In a presently preferred embodiment, such products are used in quantities comprised between 0.05 and 0.15 parts % by weight when added during the polymerization and/or in quantities comprised between 0.10 and 0.25 parts % by weight when used to treat the expandible particles prior to expansion of the particles.

Particularly satisfactory results are obtained by using dimers or trimers of unsaturated fatty acids $C_{18}$ such as oleic, linolenic, linoleic and elaidinic acid and/or the corresponding esters with $C_1-C_{18}$ alcohols and in particular $C_1-C_8$ alcohols. The dimers and trimers, or the esters, may be used alone or in admixtures with each other.

By "styrene polymers" as used herein are meant homopolymers of styrene, as well as copolymers of styrene with other vinyl and/or vinylidene monomers copolymerizable with styrene and containing at least 50% by weight of chemically combined styrene.

Examples of such comonomers are: alpha-methylstyrene, styrene halogenated in the nucleus; acrylonitrile, methacrylonitrile; esters of acrylic and/or methacrylic acids with alcohols containing from 1 to 8 carbon atoms; N-vinyl compounds such as vinylcarbazol. Also useful in the practice of this invention are those styrene copolymers which contain, besides styrene and possibly the vinyl and/or vinylidene monomers above cited, also small quantities of monomers containing two double bonds such as, for instance, divinylbenzene.

The compounds to be used as expanding agents for the styrene polymers may be selected from a wide range of compounds the characteristics of which are known to those skilled in the art.

Particularly useful as expanding agents are aliphatic hydrocarbons, as such or in suitable admixtures with each other, containing from 2 to 6 carbon atoms, such as propane, butane, pentane, hexane, cyclohexane and the like, and the halogenated derivatives of aliphatic hydrocarbons containing from 1 to 3 carbon atoms, such as, for instance, the various chlorofluoro-derivatives of methane, ethane and ethylene.

In addition to the expanding agents, the styrene polymers according to this invention may contain also other additives, such as for instance: flame-retardant agents, organic and inorganic fillers, dyes, antistatic agents, plasticizers and other similar compounds, and possibly anti-agglomerating agents for avoiding formation of crumbs in the pre-expansion phase.

The polymerization of styrene, preferably in aqueous suspension, the addition of the expanding agent, preferably during the polymerization, the treatment of the expandible particles in the pre-expansion stage, the pre-expansion of the expandible particles thus obtained, and the ageing and transformation of the pre-expanded and aged particles into shaped bodies by molding in closed molds, are carried out according to known techniques and which are described, for instance, in "Rigid Plastic Foams" by T. N. Ferrigno, Reinhold Publishing Corp., New York, USA, 1967, (second edition).

The following examples are given to illustrate the invention in greater detail and are not intended to be limiting.

EXAMPLE 1

The polymerization was carried out in aqueous suspension starting from a mixture consisting of:

| | |
|---|---|
| styrene monomer | 100 |
| deionized water | 100 |
| polymerization initiator (1) | 0.20 |
| suspending agent (2) | 0.05 |
| NaCl | 0.1 |
| treating agent (3) | 0.1 |

(1) mixture of tert-butylperoxide and tert-butyl-perbenzoate.
(2) Acrylic acid/2-ethylhexylacrylate copolymer (ratio by weight = 89/11).
(3) mixture of dimer and trimer of oleic acid.

The polymerization was carried out at temperatures varying between 100° C and 140° C, for a total time of 20 hours.

In the course of the polymerization, 8 parts by weight of an expanding agent, consisting of an n-pentane/isopentane mixture, (ratio by weight = 70/30), were added.

After cooling down at room temperature and washing with water for 7 hours at 35°–40° C, the polymer was screened so as to obtain expandible polystyrene particles having a diameter comprised between 0.9 and 1.6 mm.

These particles contained about 6% by weight of the expanding agent. The expandible particles were then mixed with 0.15% by weight of an anti-agglomerating agent of conventional type. The mixing was carried out in a screw mixer of the "SAGA" type, at room temperature over a period of about 10 minutes.

The particles thus treated were then fed into an Erlenbach Mod. K2 pre-expander, with a screw inlet on the bottom and an outlet for the pre-expanded material from the top, in which expander the particles were pre-expanded for about 5 minutes at 95°–100° C.

The pre-expanded particles were left to age in air, at room temperature for about 24 hours. The pre-expanded and aged particles were then loaded into a Rauscher block-making press until the mold cavity of 100 × 100 × 50 cm. was filled. The molding was carried out by means of steam at 1 atm. gauge.

The cooling time for the blocks is the time required for the pressure inside the block to fall to zero after conclusion of the steam-treatment.

48 hours after molding the degree of shrinkage and sintering was determined on the blocks. The latter characteristic was evaluated on a 2 cm thick plate, obtained by hot-slicing from the central part of the block and determined as the percentage (%) of expanded particles that broke when the plate was broken.

Molded blocks were obtained which showed the following characteristics:

| | |
|---|---|
| density - kg/m$^3$ | 20 |
| cooling time - minutes | 30 |
| shrinkage of block thickness | 1% |
| degree of sintering | 70% |

Blocks prepared in the absence of the dimer of unsaturated fatty acids showed the same characteristics, except for the cooling time which was 70 minutes, thus about double that obtainable when operating according to this invention.

EXAMPLE 2

Example 1 was repeated, but the mixture of dimer and trimer of unsaturated fatty acids was used also as an anti-agglomerating agent, suited for avoiding the formation of crumbs during the pre-expansion step.

For this purpose, the expandible particles, prepared according to Example 1, were additioned with 0.2% of the mixture dimer and trimer of oleic acid of the type described in Example 1.

The addition was carried out in a screw mixer of the SAGA type, for a period of 10 minutes at room temperature. The expandible particles treated with the anti-agglomerating agent were thereafter fed into an Erlenbach Mod. K2 pre-expander of the continuous type, wherein the particles were pre-expanded with steam at 95°–100° C for about 5 minutes. On the pre-expanded particles were then determined the density and the percentage (%) of the crumbs that formed during the pre-expansion.

The pre-expanded particles, with a diameter of 0.9–1.6 cm, were left to age in air for 24 hours, at room temperature, whereupon they were transformed, by molding, into a block of 100 × 100 × 50 cm, according to the procedure described in Example 1. The characteristics of the pre-expanded particles and of the molded block thus obtained were as follows:

| | |
|---|---|
| percentage of crumbs in pre-expansion | absent |
| density of block - kg/m$^3$ | 20 |
| degree of sintering % | 70 |
| cooling time, in minutes | 30 |
| shrinking of block thickness: % | 1 |

In the absence of the dimer of fatty acids used as anti-agglomerating agent, 100% of the particles were in the form of crumbs even prior to expansion and it was practically impossible to proceed with the molding of blocks having satisfactory properties.

We claim:

1. In the process for making molded bodies of styrene polymers consisting of the following steps in the order stated: polymerization of styrene or of mixtures of styrene with other monomers copolymerizable with it; addition of an expanding agent; treatment of the expandible particles with an agglomeration inhibitor for avoiding agglomeration of the particles prior to expansion thereof; pre-expansion of the expandible particles; ageing of the pre-expanded particles; and molding of the pre-expanded and aged particles in a mold which is pressure resistant but not gas-tight, the improvement which consists in carrying out the polymerization, the treatment of the expandible particles prior to pre-expansion thereof, or both the polymerization and the treatment of the expandible particles prior to pre-expansion thereof, in the presence of 0.005 to 0.5 parts by weight of dimers or trimers of unsaturated fatty acids $C_{18}$ or esters thereof with $C_1$–$C_{18}$ alcohols per 100 parts by weight of the styrene or styrene-containing polymerizable mixture.

2. In the process of claim 1, the further improvement which consists in that the polymerization of styrene or mixtures thereof with monomers copolymerizable with styrene is carried out in the presence of the dimer or trimers of unsaturated fatty acids $C_{18}$ or esters thereof with $C_1$–$C_{18}$ alcohols.

3. In the process of claim 1, the further improvement which consists in that the dimers or trimers of unsaturated acids are used in an amount of from 0.05 to 0.25 parts by weight per 100 parts by weight of the styrene or styrene-containing polymerizable mixture.

4. In the process of claim 1, the further improvement which consists in carrying out the polymerization, the treatment of the expandible particles prior to pre-expansion thereof, or both the polymerization and treatment of the expandible particles prior to pre-expansion thereof, in the presence of dimers or trimers of at least one of the unsaturated $C_{18}$ fatty acids; oleic, linolenic, linoleic and elaidinic; and/or of the corresponding esters with $C_1$–$C_8$ alcohols.

5. In the process of claim 1, the further improvement which consists in that styrene is polymerized in the presence of from 0.05 to 0.15 parts by weight of dimers of the unsaturated fatty acids per 100 parts by weight of the styrene.

6. In the process of claim 4, the further improvement which consists in treating expandible polystyrene particles prior to pre-expansion thereof with from 0.10 to 0.25 parts by weight of dimers of the unsaturated fatty acids per 100 parts by weight of the polystyrene.

7. Expandible styrene polymer particles having associated therewith dimers or trimers of unsaturated fatty acids or esters thereof with $C_1$–$C_{18}$ alcohols.

8. Expandible polystyrene particles having associated therewith dimers or trimers of unsaturated fatty acids or esters thereof with $C_1$–$C_{18}$ alcohols.

9. Shaped articles molded of expandible polymers of styrene polymers having associated therewith dimers or trimers of unsaturated fatty acids or esters thereof with $C_1$–$C_{18}$ alcohols.

* * * * *

UNITED STATES PATENT OFFICE
CERTIFICATE OF CORRECTION

Patent No. 4,003,858   Dated January 18, 1977

Inventor(s) Gianfranco BIGLIONE et al

It is certified that error appears in the above-identified patent and that said Letters Patent are hereby corrected as shown below:

Page 1, item [73] of the patent, the assignee is stated to be Montedison Fibre S.p.A., Milan, Italy, whereas according to our record the Assignment recorded in the Patent Office on December 20, 1974, Reel 3152, Frame 781, was to Montedison, S.p.A., (Milan, Italy).

Col. 2, line 6 of the patent,
Col. 3, last line   and
Col. 4, line 44 shrinkage of the block thickness should be $\leq$ 1%, not "1%", see the application, page 3, line 15; page 7, line 22; and page 8, last line.

Signed and Sealed this twelfth Day of July 1977

[SEAL]

Attest:

RUTH C. MASON
*Attesting Officer*

C. MARSHALL DANN
*Commissioner of Patents and Trademarks*